US011442653B2

(12) United States Patent
Jesionowski et al.

(10) Patent No.: US 11,442,653 B2
(45) Date of Patent: Sep. 13, 2022

(54) FEE-BASED PROVISIONING OF SUPPLEMENTAL DRIVES IN AUTOMATED DATA STORAGE LIBRARIES

(71) Applicant: International Business Machines Corporation, Armonk, NY (US)

(72) Inventors: Leonard G. Jesionowski, Tucson, AZ (US); Brian G. Goodman, Tucson, AZ (US); Jason L. Peipelman, Austin, TX (US); Ronald F. Hill, Jr., Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/224,620

(22) Filed: Dec. 18, 2018

(65) Prior Publication Data
US 2020/0192597 A1    Jun. 18, 2020

(51) Int. Cl.
*G06F 3/06* (2006.01)
*G06Q 30/02* (2012.01)
*G06Q 50/10* (2012.01)

(52) U.S. Cl.
CPC .......... *G06F 3/0653* (2013.01); *G06F 3/0607* (2013.01); *G06F 3/0631* (2013.01); *G06F 3/0676* (2013.01)

(58) Field of Classification Search
None
See application file for complete search history.

(56) References Cited

U.S. PATENT DOCUMENTS

| | | | |
|---|---|---|---|
| 2,941,738 A * | 6/1960 | Burke et al. | |
| 5,646,918 A * | 7/1997 | Dimitri et al. | |
| 6,636,942 B2 | 10/2003 | Greco | |
| 6,956,714 B2 | 10/2005 | Oohara et al. | |
| 7,272,081 B2 * | 9/2007 | Goodman et al. | |
| 7,466,511 B2 | 12/2008 | Ishiyama | |
| 7,619,949 B2 | 11/2009 | Johnson et al. | |
| 8,230,235 B2 * | 7/2012 | Goodman et al. | |

(Continued)

OTHER PUBLICATIONS

J. P. Harris, R. S. Rohde and N. K. Arter, "The IBM 3850 mass storage system: Design aspects," in Proceedings of the IEEE, vol. 63, No. 8, pp. 1171-1176, Aug. 1975, doi: 10.1109/PROC.1975.9911 ("Harris").*

(Continued)

*Primary Examiner* — Michael Alsip
(74) *Attorney, Agent, or Firm* — Zilka-Kotab, P.C.

(57) ABSTRACT

A computer-implemented method, according to one embodiment, includes: receiving tracking information which corresponds to an amount that at least one supplemental data storage drive of an automated data storage library was used during a period of time. The automated data storage library in turn includes: one or more primary data storage drives, and one or more robotic accessors physically configured to access each of the one or more primary data storage drives and the at least one supplemental storage drive. Accordingly, the tracking information is used to calculate a usage fee which corresponds to the amount that the at least one supplemental data storage drive was used during the period of time. Furthermore, the usage fee is sent to a user associated with the automated data storage library.

14 Claims, 12 Drawing Sheets

(56) References Cited

U.S. PATENT DOCUMENTS

| | | |
|---|---|---|
| 8,879,198 B2 | 11/2014 | Minemura |
| 9,401,180 B2 * | 7/2016 | Abe et al. |
| 10,126,971 B1 * | 11/2018 | Jain et al. |
| 2007/0047280 A1 * | 3/2007 | Haustein ............... G06F 3/0617 365/1 |
| 2007/0050569 A1 * | 3/2007 | Haustein ............... G06F 3/0605 711/154 |
| 2008/0089190 A1 | 4/2008 | Green et al. |

OTHER PUBLICATIONS

IBM TotalStorage 3584 Tape Library circa 2005.*
D. J. Hellman et al. "Innovations in tape storage automation at IBM" IBM J. Res. & Dev. vol. 47 No. 4 Jul. 2003 ("Hellman").*
Aussie Storage Blog.*

* cited by examiner

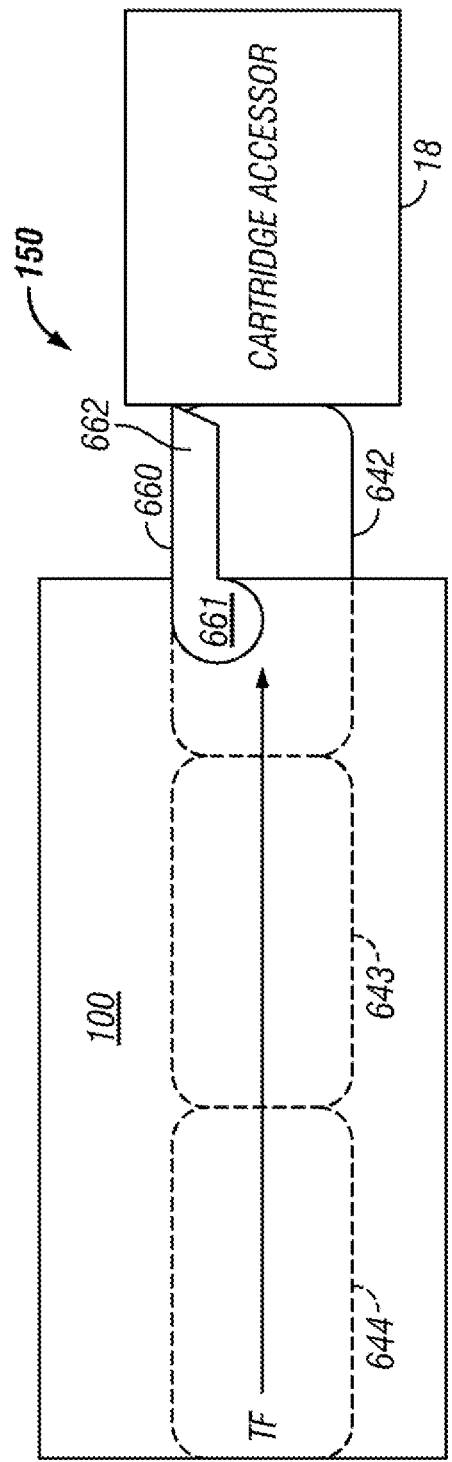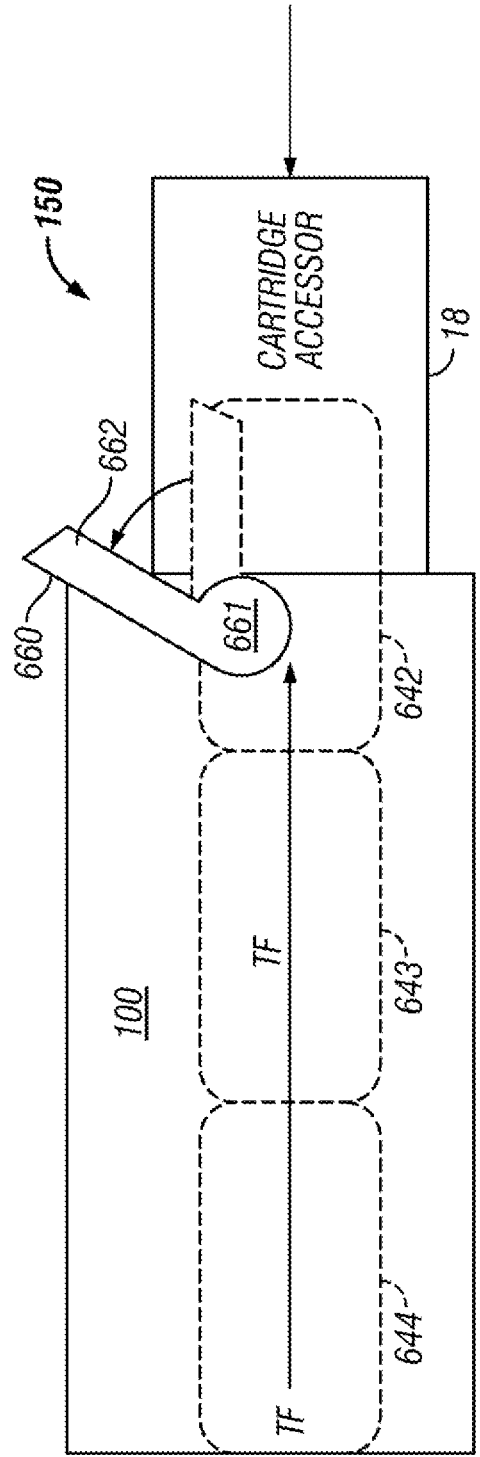
FIG. 8A
FIG. 8B

FEE-BASED PROVISIONING OF SUPPLEMENTAL DRIVES IN AUTOMATED DATA STORAGE LIBRARIES

BACKGROUND

The present invention relates to data storage systems, and more particularly, this invention relates to configurations of drives in automated data storage libraries.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media". Data storage cartridge media may comprise any type of media on which data may be stored and which may serve as removable media, including but not limited to magnetic media (such as magnetic tape or disks), optical media (such as optical tape or discs), electronic media (such as PROM, EEPROM, flash PROM, CompactFlash™, Smartmedia™, Memory Stick™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the horizontal (X) and vertical (Y) directions.

In an effort to increase storage capacity, deep slot technology allows for storage cells that contain more than a single data storage cartridge. Such storage libraries allow for higher density, or more cartridges stored per square foot. In deep slot libraries, two or more cartridges may be stored in a multi-cartridge deep slot cell, arrayed in series, one behind the other, in tiers ranging from a frontmost tier to a rearmost tier.

However, as the size and capacity of data storage libraries continue to increase, the increasing amount of data stored therein become more prone to experiencing larger fluctuations in demand. For instance, a tape library used to store copies of financial transactions for a company may typically experience a nominal level of demand for data. However, following a disaster event or a successful hacking attempt, the tape library may be required to perform a total library recall in a short amount of time.

Although maintaining low data access times irrespective of the demand placed on a data storage library is highly desirable, many storage systems are unable to justify the significant costs associated with the hardware required in order to do so. This is because a substantial portion of the hardware included in such a data storage library would rarely, if ever, be used. Yet on the other hand, attempting to add hardware to the storage library in response to experiencing a demand spike or remove hardware in response to experiencing a dip in demand is a slow process which typically takes much longer to actually implement than the fluctuations in demand last.

SUMMARY

A computer-implemented method, according to one embodiment, includes: receiving tracking information which corresponds to an amount that at least one supplemental data storage drive of an automated data storage library was used during a period of time. The automated data storage library in turn includes: one or more primary data storage drives, and one or more robotic accessors physically configured to access each of the one or more primary data storage drives and the at least one supplemental storage drive. Accordingly, the tracking information is used to calculate a usage fee which corresponds to the amount that the at least one supplemental data storage drive was used during the period of time. Furthermore, the usage fee is sent to a user associated with the automated data storage library.

Accordingly, the automated data storage library is able to implement one or more supplemental data storage drives at a cost which corresponds to how much they are actually used. Providing reduced cost media drives significantly decreases the price associated with achieving a desirable level of performance while also providing the hardware provider the ability to recuperate some of the cost of the hardware by charging a usage fee. Again, the usage fee preferably corresponds to the amount that these supplemental storage drives are actually used in the data storage library, thereby allowing the storage library the ability to meet sudden demand spikes at a reasonable cost. It follows that these supplemental storage drives act as insurance storage drives which are available if needed, thereby achieving a data storage system configuration that is favorable for both the customer and the hardware provider.

In some approaches, each of the one or more primary data storage drives may also have a higher level of performance than a level of performance of each of the at least one supplemental data storage drive. The lower achievable level of performance associated with the supplemental data storage drives may further assist in reducing the acquisition cost thereof. In some approaches one or more of the supplemental storage drives may even be a refurbished storage drive and/or a storage drive with limited functionality.

A computer program product, according to another embodiment, includes a computer readable storage medium having program instructions embodied therewith. The program instructions are readable and/or executable by a processor to cause the processor to: perform the foregoing method.

A storage system, according to yet another embodiment, includes: an automated data storage library. The automated data storage library includes: one or more primary data storage drives, at least one supplemental data storage drive, and one or more robotic accessors physically configured to access each of the one or more primary data storage drives and the at least one supplemental storage drive. The storage system further includes a processor, as well as logic which is integrated with the processor, executable by the processor, or integrated with and executable by the processor. The logic is configured to: perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 8A-8D are partial side views of a cartridge blocking mechanism according to one approach.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a computer-implemented method includes: receiving tracking information which corresponds to an amount that at least one supplemental data storage drive of an automated data storage library was used during a period of time. The automated data storage library in turn includes: one or more primary data storage drives, and one or more robotic accessors physically configured to access each of the one or more primary data storage drives and the at least one supplemental storage drive. Accordingly, the tracking information is used to calculate a usage fee which corresponds to the amount that the at least one supplemental data storage drive was used during the period of time. Furthermore, the usage fee is sent to a user associated with the automated data storage library.

In another general embodiment, a computer program product includes a computer readable storage medium having program instructions embodied therewith. The program instructions are readable and/or executable by a processor to cause the processor to: perform the foregoing method.

In yet another general embodiment, a storage system includes: an automated data storage library. The automated data storage library includes: one or more primary data storage drives, at least one supplemental data storage drive, and one or more robotic accessors physically configured to access each of the one or more primary data storage drives and the at least one supplemental storage drive. The storage system further includes a processor, as well as logic which is integrated with the processor, executable by the processor, or integrated with and executable by the processor. The logic is configured to: perform the foregoing method.

Figure 1:
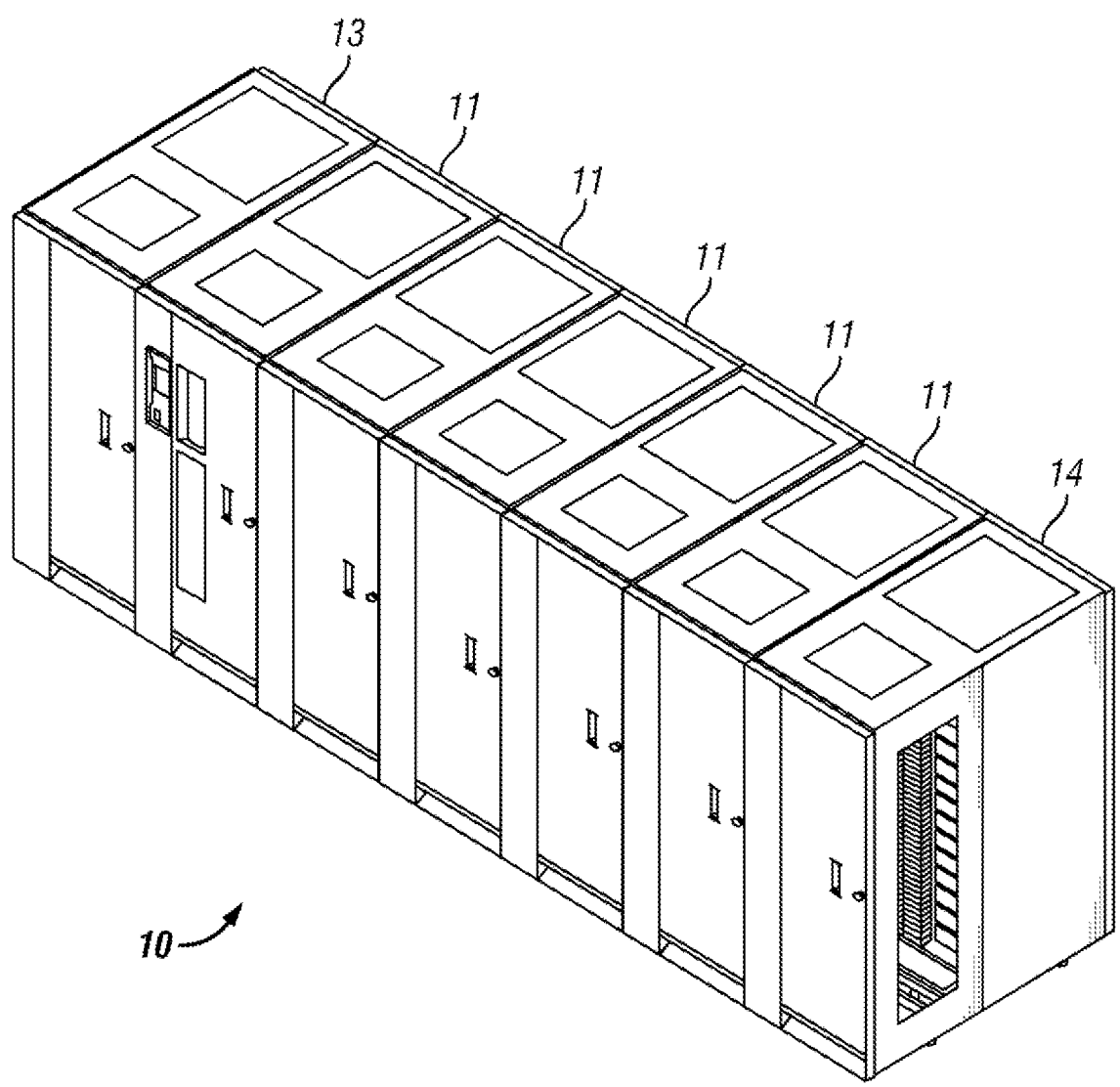
FIG. 1 is a perspective view of an automated data storage library according to one approach.
Figure 2:
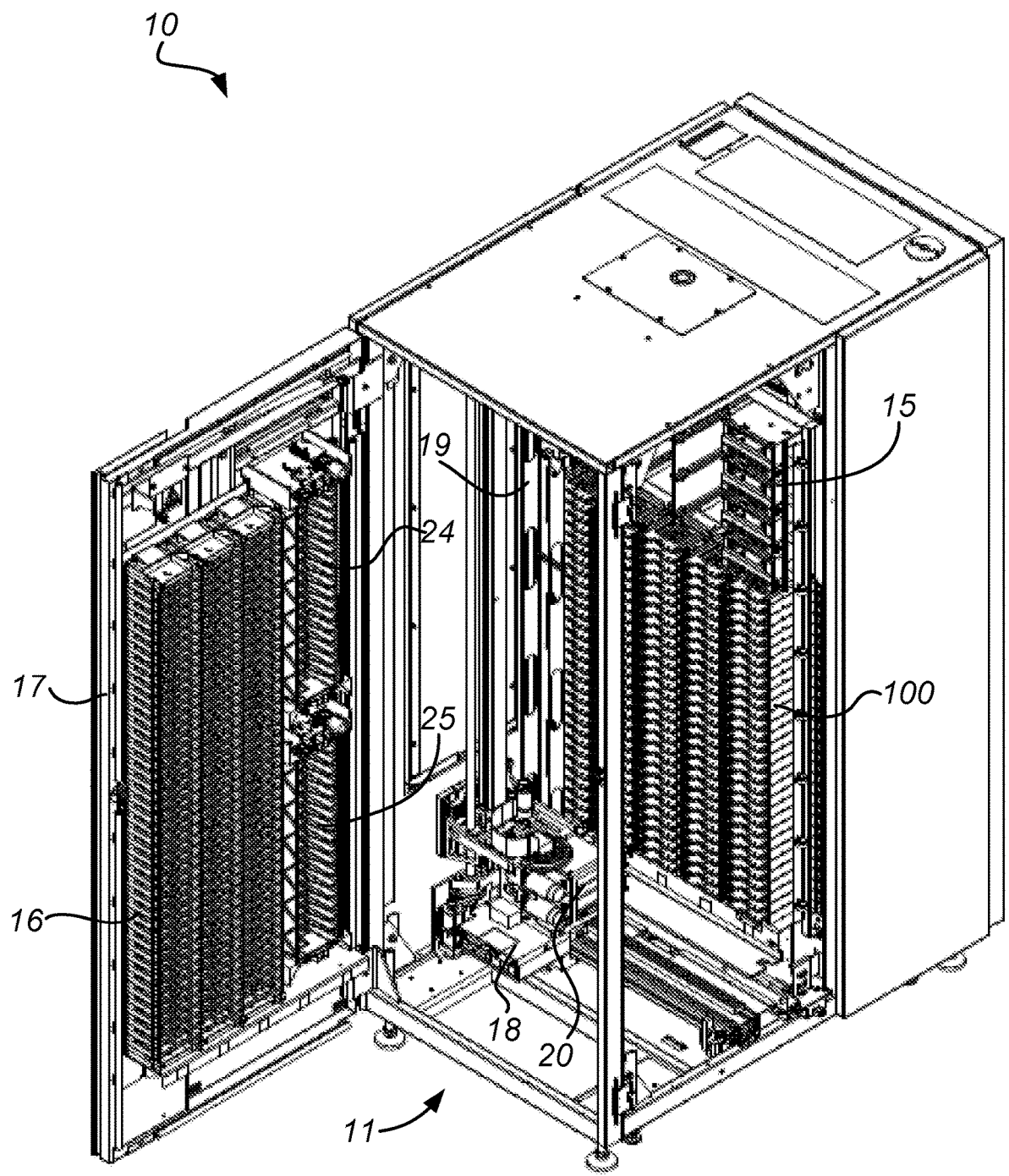
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary implementation of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other approaches, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disc drives, magnetic tape drives, solid state drives having non-volatile random access memory (NVRAM) such as Flash memory, or other types of data storage drives as are used to read and/or write data with respect to the data storage media.

As illustrated, the storage frame 11 may optionally include an operator panel or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner or other reading system, such as a cartridge memory reader or similar system mounted on the gripper assembly 20, to "read" identifying information about the data storage media.

Figure 3:
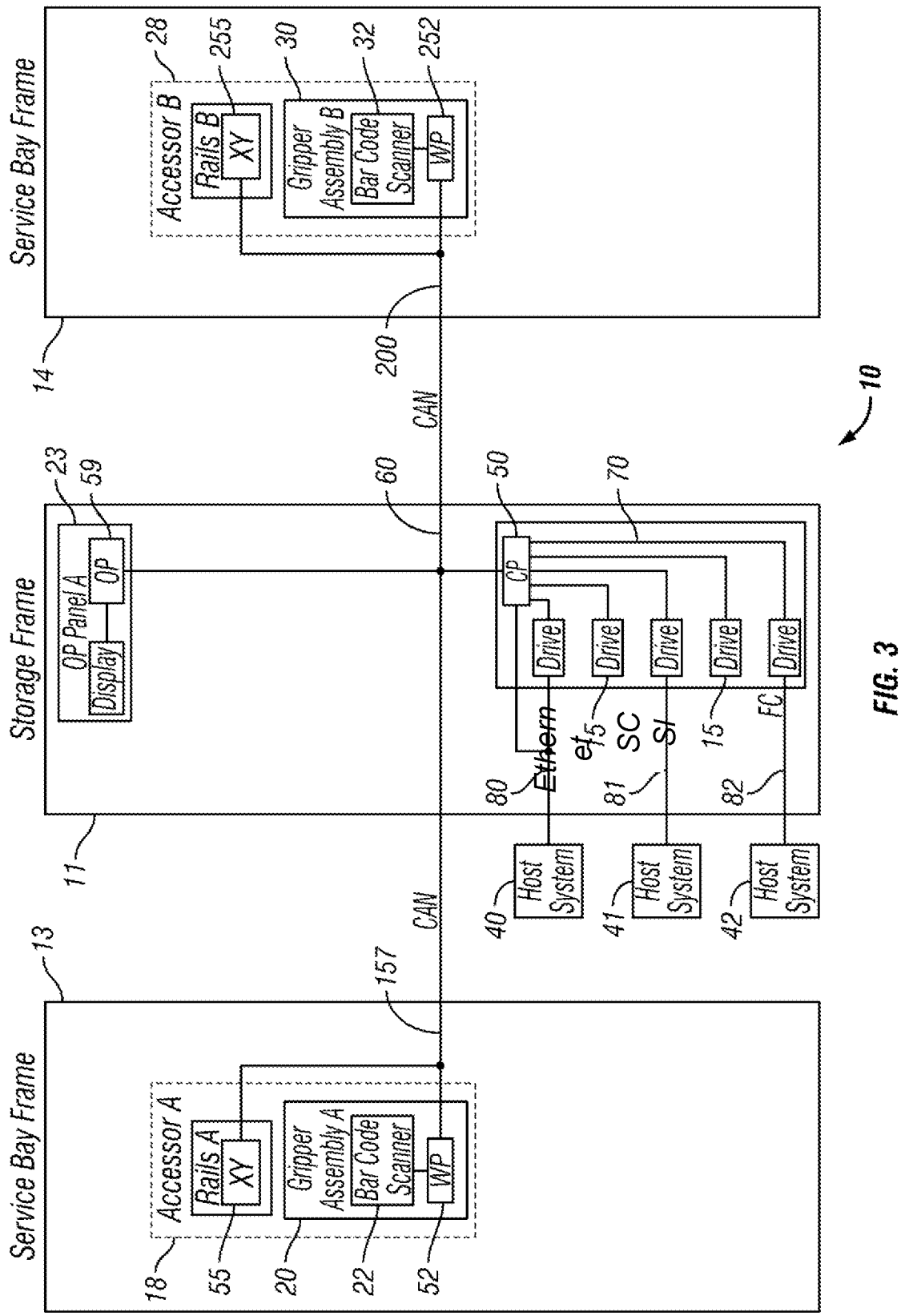
FIG. 3 is a block diagram of an automated data storage library according to one approach.

FIG. 3 depicts an automated data storage library 10, in accordance with one implementation. As an option, the present automated data storage library 10 may be implemented in conjunction with features from any other approach listed herein, such as those described with reference to the other FIGS. Of course, however, such automated data storage library 10 and others presented herein may be used in various applications and/or in permutations which may or may not be specifically described in the illustrative approaches listed herein. Further, the automated data storage library 10 presented herein may be used in any desired environment. Thus FIG. 3 (and the other FIGS.) should be deemed to include any and all possible permutations.

Referring now to FIG. 3, the automated data storage library 10 as described in reference to FIGS. 1 and 2, is depicted. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a bar code scanner (e.g., reading system) to "read" identifying information about the data storage media depending on the desired approach. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus, in different approaches, the two accessors 18, 28 may share one or more mechanical paths, they may have completely independent mechanical paths, or combinations thereof. In one example, the accessors 18, 28 may have a common horizontal rail with independent vertical rails to travel thereal-ong. Moreover, it should be noted that the first and second accessors 18, 28 are described as first and second for descriptive purposes only and this description is not meant to limit either accessor to an association with either the left hand service bay 13, or the right hand service bay 14.

In an exemplary approach which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on line 80, through one or more control ports (not shown), or through one or more data storage drives 15 on lines 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one approach, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a communication link, e.g., lines 70, for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42. Alternatively, the host systems 40, 41, 42 may be directly coupled to the communication processor node 50, at input line 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connection lines 80 and 81 are intended to be Ethernet and a SCSI bus, respectively, e.g., and may serve as host connections. However, line 82 may be a bus in some approaches, and comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus, the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover, the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
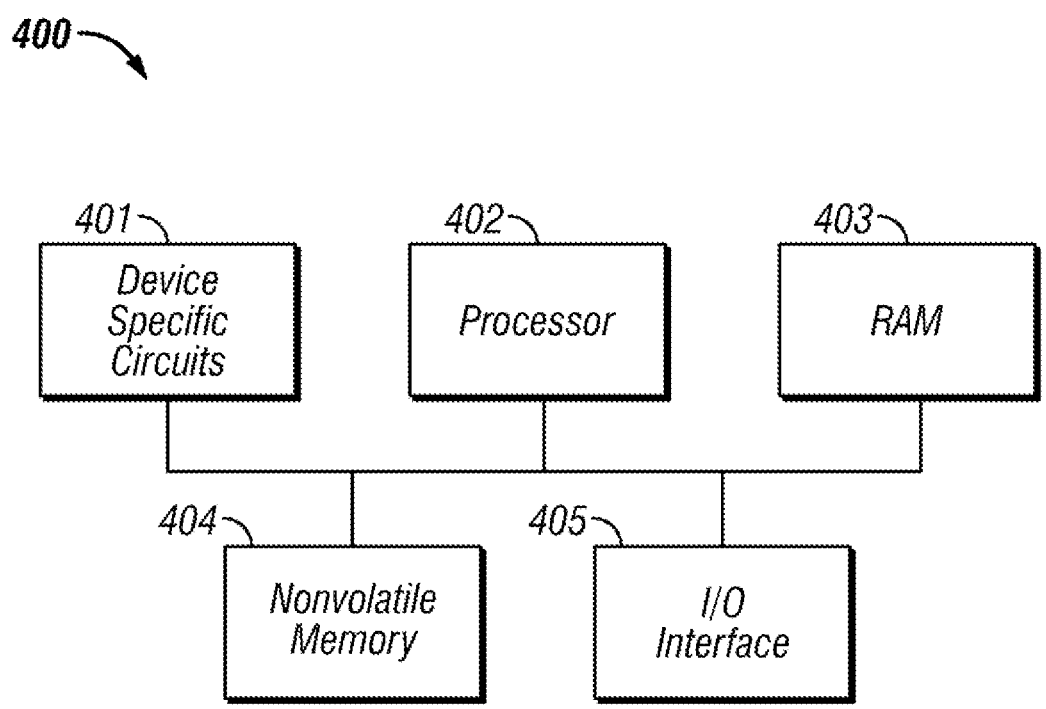
FIG. 4 is a block diagram depicting a controller configuration according to one approach.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired approach. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
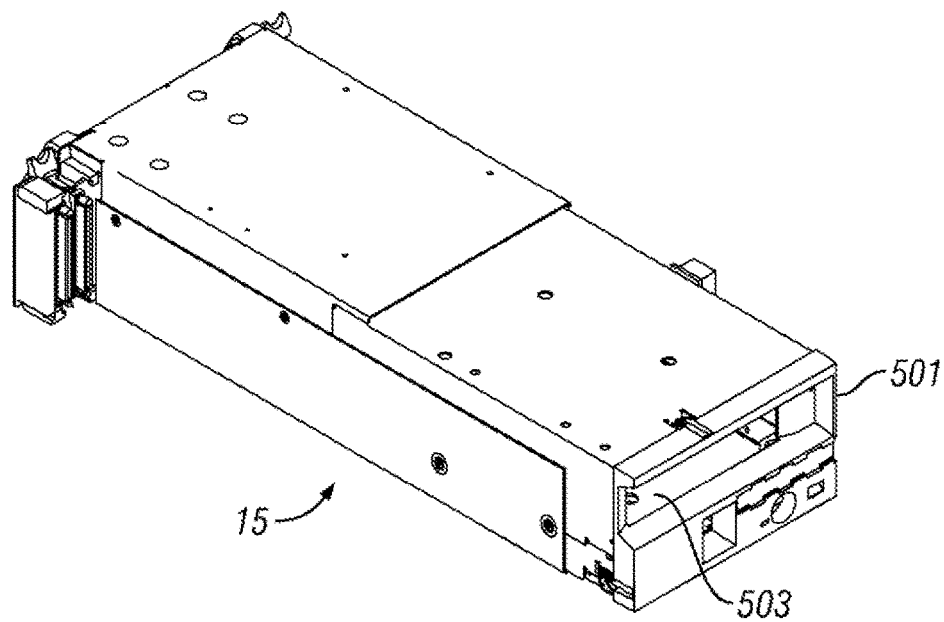
FIG. 5A is a front perspective view of a data storage drive according to one approach.
Figure 5B:
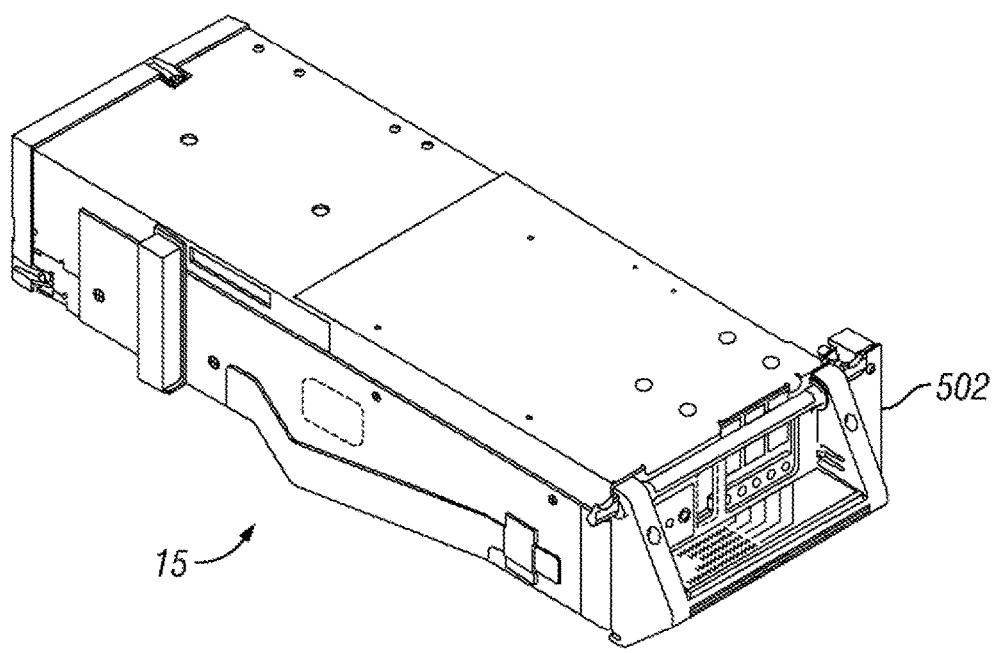
FIG. 5B is a rear perspective view of the data storage drive of FIG. 5A.

FIGS. 5A-5B illustrate the front 501 and rear 502 views of a data storage drive 15, according to one implementation. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
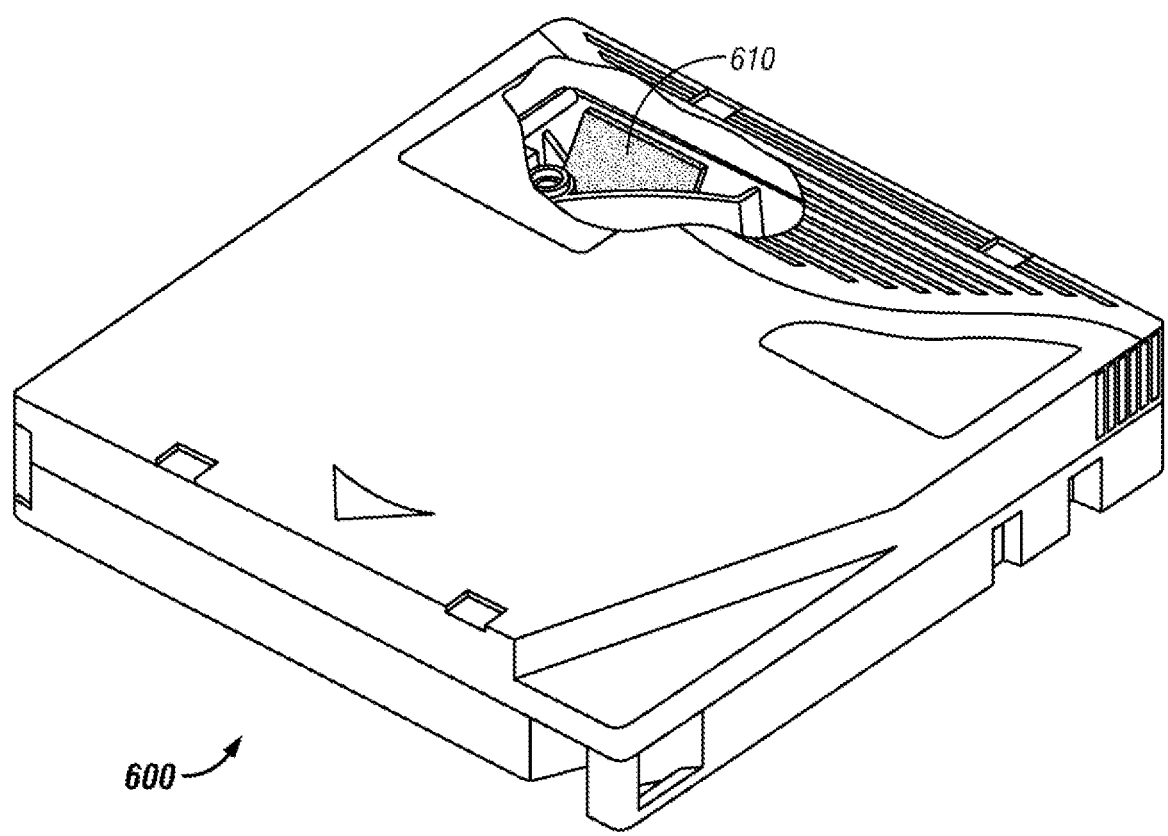
FIG. 6 is perspective view of a data storage cartridge having a cutaway portion according to one approach.

Furthermore, FIG. 6 illustrates an exemplary implementation of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, discs, etc.; electronic media, e.g., PROM, EEPROM, flash PROM, CompactFlash™, Smartmedia™, Memory Stick™, etc.; etc., or other suitable media. Moreover, an example of a data storage cartridge that is widely employed in automated data storage libraries for mass data storage is a magnetic tape cartridge in which the media is magnetic tape.

Figure 7A:
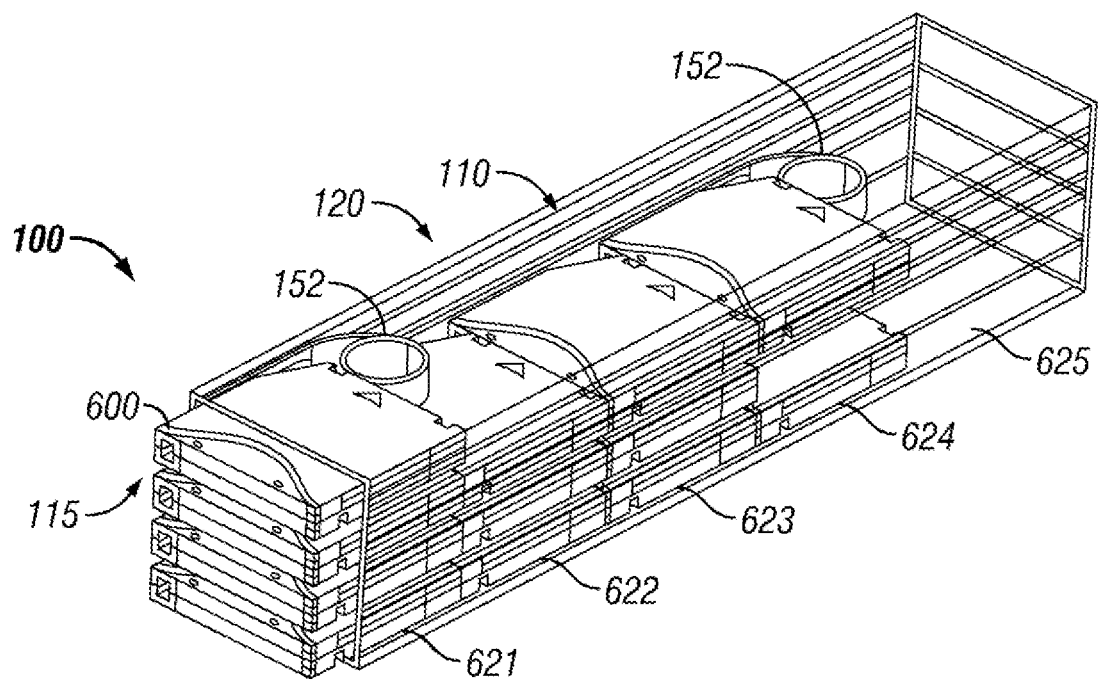
FIGS. 7A-7B are perspective views of a multi-cartridge deep slot cell according to one approach.
Figure 7B:
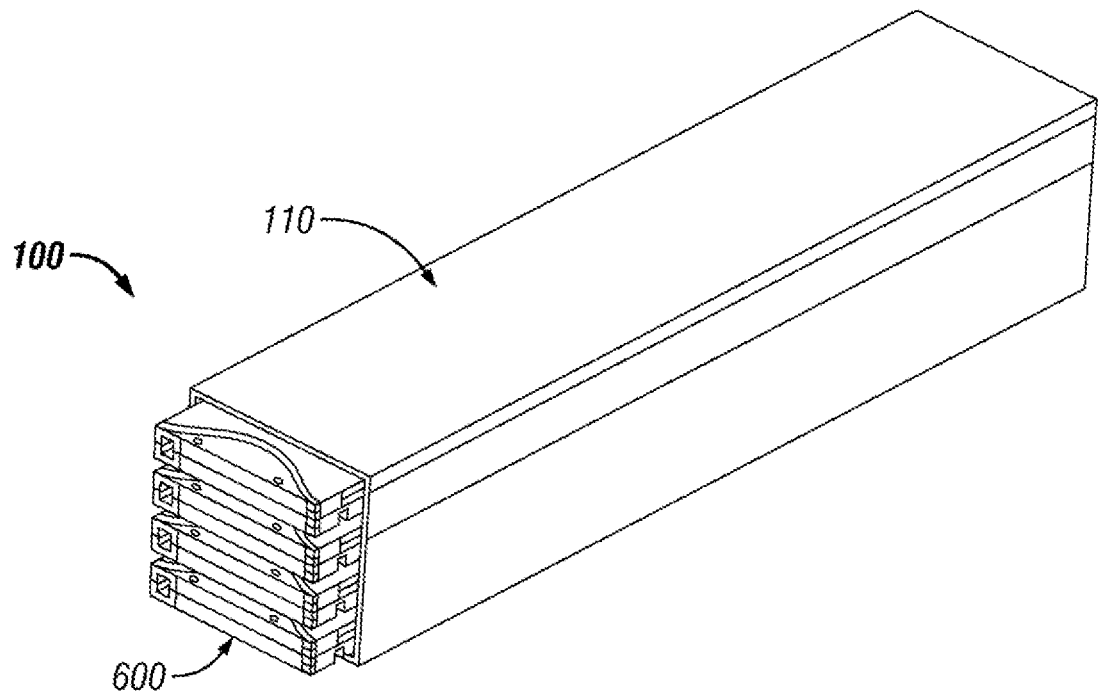

Looking now to FIGS. 7A-7B, a multi-cartridge deep slot cell 100 having biasing springs 152 is depicted according to one implementation. As shown, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an implementation of a cartridge blocking mechanism 150 having a retaining gate 660 that retains the data storage cartridges in the multi-cartridge deep slot cell 100. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

Figure 8C:
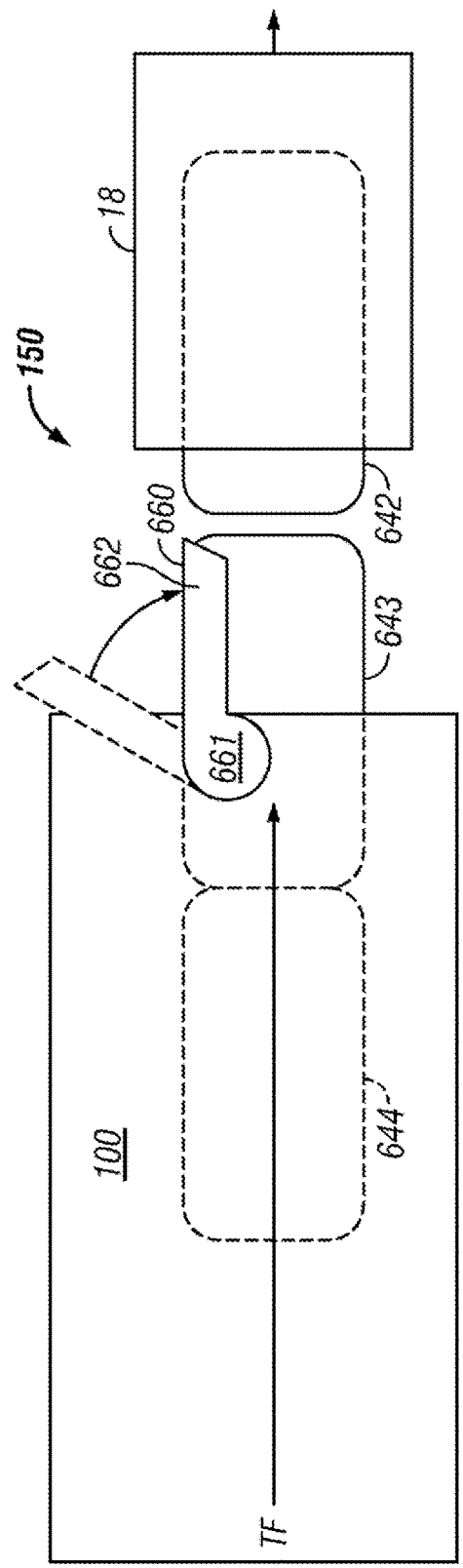

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Figure 8D:
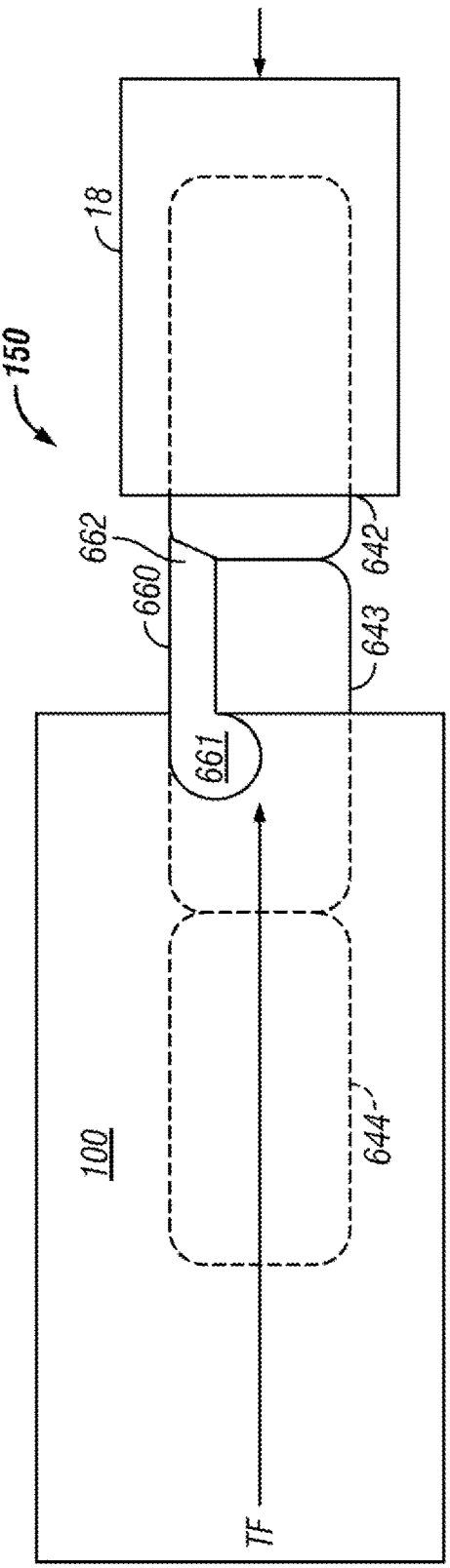

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

Thus, looking to various approaches presented herein, access to a storage slot may include the ability to remove a cartridge from a storage slot, the ability to place a cartridge into a storage slot, or combinations thereof.

According to an exemplary approach, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one approach, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one approach, the single cartridge storage slots 16 are also termed "tier 0".

Referring again to FIGS. 1-3, according to one approach, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one approach, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 9:
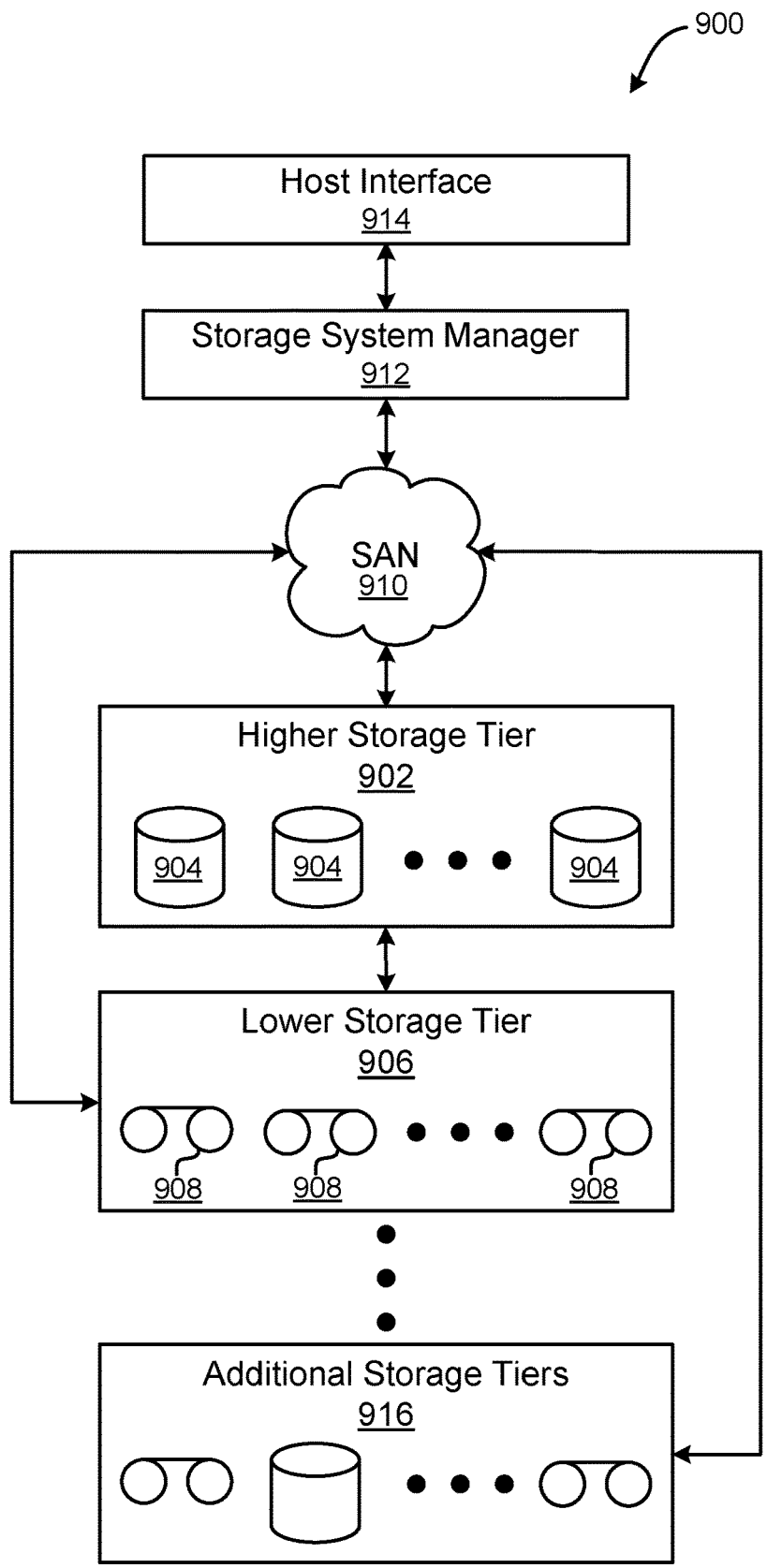
FIG. 9 is a depiction of a tiered data storage system according to one approach.

Now referring to FIG. 9, a storage system 900 is shown according to one implementation. Note that some of the elements shown in FIG. 9 may be implemented as hardware and/or software, according to various approaches. In some approaches, the storage system 900 may be implemented in an automated data storage library such as that shown in FIGS. 1-2. In other approaches, an automated data storage library such as that shown in FIGS. 1-2 may be a tier of the storage system 900.

The storage system 900 may include a storage system manager 912 for communicating with a plurality of media on at least one higher storage tier 902 and at least one lower storage tier 906. The higher storage tier(s) 902 preferably may include one or more random access and/or direct access media 904, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 906 may preferably include one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Also, any of the higher storage tiers 902 and/or the lower storage tiers 906 may include some combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 900 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the approaches presented herein.

According to some approaches, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions. Of course, this logic may be implemented as a method on any device and/or system or as a computer program product, according to various approaches.

As previously mentioned, the continued increase size and capacity of data storage libraries has also led to an increase in the amount of data stored therein. As a result, data storage libraries have become more prone to experiencing large fluctuations in demand. For instance, a tape library used to store copies of financial transactions for a company may typically experience a nominal level of demand for data. However, following a disaster event or a successful hacking attempt, the tape library may be required to perform a total library recall in a short amount of time.

Although maintaining low data access times irrespective of the demand placed on a data storage library is highly desirable, many storage systems are unable to justify the significant costs associated with the hardware required in order to do so. This is because a substantial portion of the hardware included in such a data storage library would rarely, if ever, be used. Yet on the other hand, attempting to add hardware to the storage library in response to experiencing a demand spike or remove hardware in response to experiencing a dip in demand is a slow process which typically takes much longer to actually implement than the fluctuations in demand last.

In sharp contrast to the foregoing shortcomings which have previously been experienced by storage systems, various ones of the approaches included herein are able to provide data storage systems with a higher achievable throughput at a fraction of the cost. This is achieved in some of the approaches herein by providing data processing hardware (e.g., such as data storage drives) to a user at a fraction of the actual price of the hardware upfront, after which usage fees are issued based on an amount that the data processing hardware is actually used. As a result, the user is able to increase achievable performance at a minimal upfront price while also giving the hardware provider the ability to recuperate the cost of the hardware based on an amount that it is actually used, e.g., as will be described in further detail below. It should also be noted that the term "hardware provider" is intended to refer to the entity (e.g., the hardware manufacturer, hardware retailer, service provider, etc.) which offers the hardware to the user for sale or lease at a discounted rate, thereafter managing the use of the hardware and issuing usage fees accordingly.

Figure 10A:
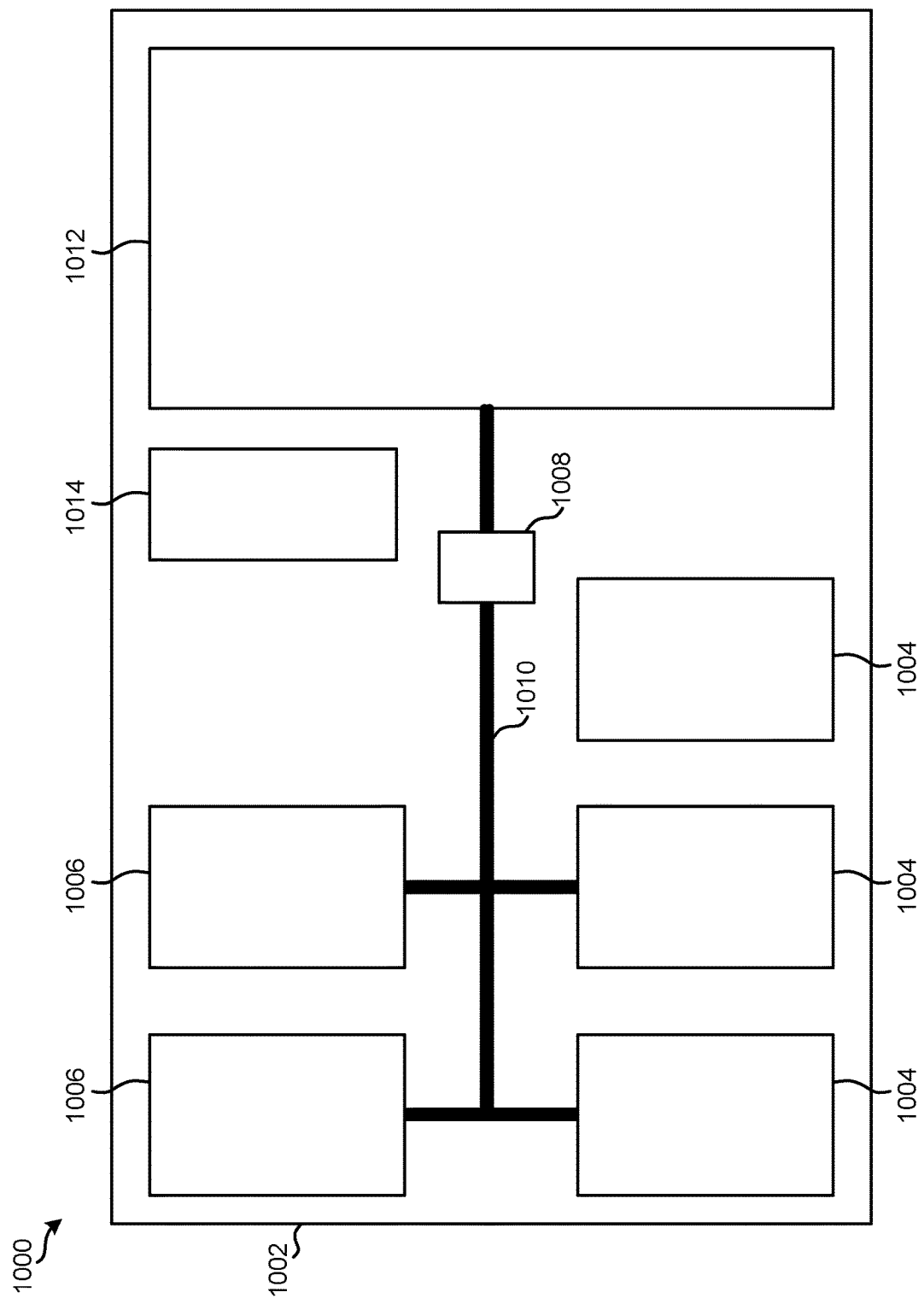
FIG. 10A is a high level, representational view of a storage system according to one approach.

Looking to FIG. 10A, a storage system 1000 is illustrated in accordance with one implementation. As an option, the present storage system 1000 may be implemented in conjunction with features from any other approach listed herein, such as those described with reference to the other FIGS. However, such storage system 1000 and others presented herein may be used in various applications and/or in permutations which may or may not be specifically described in the illustrative approaches listed herein. Further, the storage system 1000 presented herein may be used in any desired environment. Thus FIG. 10A (and the other FIGS.) may be deemed to include any possible permutation.

As shown, the storage system 1000 includes an automated data storage library 1002. Depending on the approach, the data storage library 1002 may include any type(s) of storage media. For instance, the data storage library 1002 may include magnetic media, e.g., magnetic tape, disks, etc.; optical media, e.g., optical tape, discs, etc.; electronic media, e.g., PROM, EEPROM, flash PROM, etc.; etc., or other suitable media.

The data storage library 1002 further includes a number of primary data storage drives 1004 as well as a number of supplemental data storage drives 1006. As mentioned above, the data storage drives 1004, 1006 may be optical disc drives, magnetic tape drives, solid state drives having NVRAM (e.g., such as Flash memory), etc., and/or combinations thereof, e.g., depending on the desired approach. However, according to an illustrative example, which is in no way intended to limit the invention, the data storage library 1002 is a magnetic tape library which includes a plurality of magnetic tapes. Accordingly, one or more of the data storage drives 1004, 1006 may be magnetic tape drives, each having a magnetic head and a drive mechanism for passing a magnetic tape over the magnetic head therein.

Figure 10B:
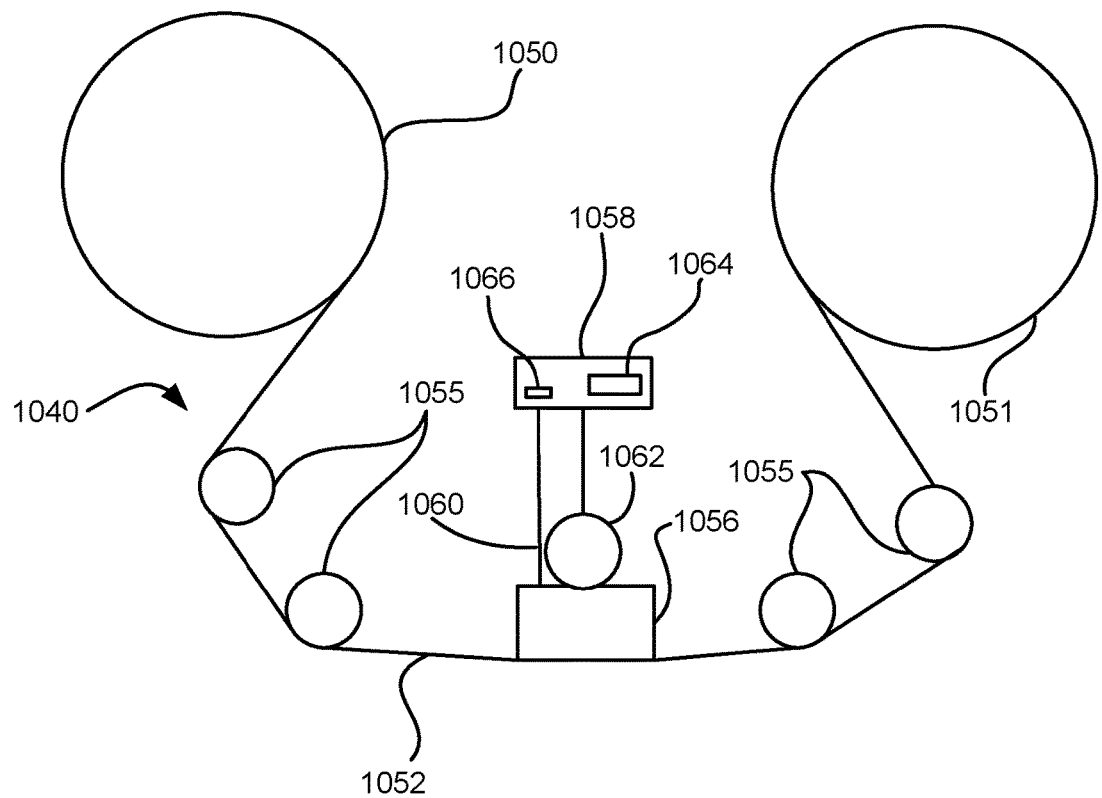
FIG. 10B is a schematic diagram of a simplified tape drive according to one approach.

For instance, referring momentarily to FIG. 10B, a schematic diagram of an exemplary tape drive 1040 is illustrated according to one approach. The tape drive 1040 may be implemented in a tape-based data storage system, which may be employed in the context of any of the data storage drives 1004, 1006 in FIG. 10A. As shown, a tape supply cartridge 1050 and a take-up reel 1051 are provided to support a tape 1052. One or more of the reels may form part of a removable cartridge and are not necessarily part of the tape drive 1040. The tape drive 1040 may further include drive motor(s) to drive the tape supply cartridge 1050 and/or the take-up reel 1051 to move the tape 1052 over a tape head 1056 of any type. Such head may include an array of readers, writers, or both.

Guides 1055 guide the tape 1052 across the tape head 1056. Such tape head 1056 is in turn coupled to a controller 1058 via a cable 1060. The controller 1058, may be or include a processor and/or any logic for controlling any subsystem of the drive 1040. For example, the controller 1058 typically controls head functions such as servo following, data writing, data reading, etc. The controller 1058 may include at least one servo channel and at least one data channel, each of which include data flow processing logic configured to process and/or store information to be written to and/or read from the tape 1052. The controller 1058 may operate under logic known in the art, as well as any logic disclosed herein, and thus may be considered as a processor for any of the descriptions of tape drives included herein, in various approaches. The controller 1058 may be coupled to a memory 1066 of any known type, which may store instructions executable by the controller 1058. Moreover, the controller 1058 may be configured and/or programmable to perform or control some or all of the methodology presented herein. Thus, the controller 1058 may be considered to be configured to perform various operations by way of logic programmed into one or more chips, modules, and/or blocks; software, firmware, and/or other instructions being available to one or more processors; etc., and combinations thereof.

The cable 1060 may include read/write circuits to transmit data to the tape head 1056 to be recorded on the tape 1052 and to receive data read by the tape head 1056 from the tape 1052. An actuator 1062 controls position of the tape head 1056 relative to the tape 1052. An interface 1064 may also be provided for communication between the tape drive 1040 and an internal or external controller (e.g., see 1014 in FIG. 10A) to send and receive the data and for controlling the operation of the tape drive 1040 and communicating the status of the tape drive 1040 to the host, all as will be understood by those of skill in the art.

Returning to FIG. 10A, a robotic accessor 1008 is also included in the data storage library 1002. As shown, the robotic accessor 1008 is physically configured to access each of the primary data storage drives 1004 and the supplemental storage drives 1006 along a track 1010. However, in other approaches the robotic accessor 1008 may be able to access each of the data storage drives 1004, 1006 differently, e.g., using wheels to navigate freely along a surface. The robotic accessor 1008 is also able to access a media storage module 1012 along the track 1010. Although not shown, the media storage module 1012 includes a plurality of removable media, e.g., such as data storage cartridges. The robotic accessor 1008 is thereby preferably able to selectively transfer removable media between the data storage drives 1004, 1006 and the media storage module 1012. Thus, as data requests are received, the robotic accessor 1008 receives instructions from the library controller 1014 to access certain ones of the removable media having data which corresponds to the received data requests, and transport those certain ones of the removable media to the primary data storage drives 1004 and/or the supplemental storage drives 1006, e.g., as will be described in further detail below.

As mentioned, the controller 1014 (e.g., processor) is preferably able to receive data operations from users, other storage systems, host computers, running applications, etc., and process them. By processing the data operations, the controller 1014 is able to identify ones of the removable media stored in the media storage module 1012 which include the data that corresponds to one or more of the data operations. The controller 1014 may thereby send one or more instructions to the robotic accessor 1008 to access the identified removable media and transfer the media to the primary data storage drives 1004. However, in certain situations the supplemental storage drives 1006 may be utilized, e.g., as will soon become apparent.

As mentioned above, various ones of the approaches included herein are able to provide data storage systems with a higher achievable throughput at a fraction of the cost. This is achieved in some of the approaches herein by providing data processing hardware (e.g., such as data storage drives) to a user at a fraction of the actual price of the hardware upfront, after which usage fees are issued based on an amount that the data processing hardware is actually used. Applying this scheme to FIG. 10A, the primary data storage drives 1004 are preferably used to perform data operations as they are received, while the supplemental storage drives 1006 are utilized more selectively. While the supplemental storage drives 1006 may have been obtained at a reduced price relative to the manufacturer's suggested retail price (MSRP) thereof, additional fees may be incurred by the storage system 1000 based on an amount that the supplemental storage drives 1006 are actually used to perform data processing. According to an example, which is in no way intended to limit the invention, each of the supplemental storage drives 1006 are purchased from a drive provider for 25% of the MSRP thereof.

In some approaches, each of the primary data storage drives 1004 also has a higher level of performance than a level of performance of each of the supplemental data storage drives 1006. In other words, the primary data storage drives 1004 are capable of achieving a higher level of performance at least in comparison to the supplemental data storage drives 1006, e.g., in terms of achievable throughput, data processing rates, operating efficiency, etc. The lower achievable level of performance associated with the supplemental data storage drives 1006 may further assist in reducing the acquisition cost thereof. In some approaches one or more of the supplemental storage drives 1006 may even be a refurbished storage drive and/or a storage drive with limited functionality, e.g., such as a "half-height" tape drive (whereas the primary data storage drives 1004 may be "full-height" tape drives).

Furthermore, reduced warranty options may be made available to further reduce costs associated with the supplemental storage drives 1006. According to some approaches, a minimal warranty may be made available for each of the supplemental storage drives 1006 which only covers hardware which does not operate properly, or at all, upon delivery. Accordingly, any post-delivery maintenance of the supplemental storage drives 1006 would serve as a deferred cost as well, only arising in the relevant situations.

Further still, in some approaches one or more of the supplemental storage drives 1006 may only share a mechanical relationship with the data storage library 1002 in order to further reduce costs associated with the supplemental storage drives 1006. In general, data storage libraries share any number of relationships with the tape drives that are included therein. For instance, in some approaches the data storage library 1002 shares a mechanical relationship with the primary data storage drives 1004 in that the mechanical operations performed by the data storage library 1002 are compatible with the mechanical design and structure of the primary data storage drives 1004, e.g., such as inserting and ejecting data storage cartridges. In other approaches the data storage library 1002 shares a communication relationship with the primary data storage drives 1004 in that the data storage library 1002 is able to communicate with the primary data storage drives 1004 and monitor performance, perform firmware updates, assist with issue resolutions, gathering performance logs, etc. Thus, by limiting the interactions between the data storage library 1002 and the supplemental storage drives 1006 to a mechanical context, additional cost savings may be realized by the consumer. In such approaches, the customer may assume responsibility of managerial tasks such as determining supplemental storage drive health (e.g., using in-band methods), physically install and/or service the supplemental storage drives, etc.

In view of the reduced prices at which the supplemental storage drives 1006 may be obtained by customers, it may be in the hardware provider's interest to ensure these discounted drives are used for their intended purpose, e.g., inside the customer's data storage library. Accordingly, the supplemental storage drives 1006 may be limited to only performing library-to-drive communications, thereby ensuring the drives remain implemented in their respective storage library. In other approaches, one or more of the supplemental storage drives 1006 may be limited to basic communication interfaces, e.g., such as I2C, near-field communication (NFC), radio-frequency identification (RFID), etc.

Referring still to FIG. 10A, the storage system 1000 may choose to limit the amount that the supplemental storage drives 1006 are actually used by defining circumstances in which one or more of them may be used to perform data operations. According to different approaches, these circumstances may be defined based on a number of data operations waiting in a queue, experienced delay times, whether user input (permission) has been received, how much of a budget allocated for supplemental storage drive usage fees remains, etc. Thus, although the robotic accessor 1008 is physically capable of delivering removable media to the supplemental storage drives 1006, it may be prevented from doing so. In other words, the supplemental storage drives 1006 may be physically and/or logically locked from use outside of situations which meet the predefined circumstances. However, upon determining that using one or more of the supplemental storage drives 1006 is justified for a given situation, one or more of the supplemental storage drives 1006 may be physically and/or logically unlocked, thereby allowing the robotic accessor 1008 to physically deliver one or more removable media to one or more of the supplemental storage drives 1006. As a result, the storage system 1000 is desirably able to increase achievable performance levels for a minimal upfront price while also giving the drive provider the ability to recuperate the cost of the hardware based on an amount that it is actually used.

It follows that in preferred approaches the controller 1014 is able to track an amount that the supplemental storage drives 1006 is used during a period of time. The controller 1014 may also be able to calculate a usage fee which corresponds to the amount that the supplemental storage drives 1006 was used during the period of time. In other approaches, usage data which corresponds to the amount that the supplemental storage drives 1006 was used during the period of time may be sent to another location to actually calculate the usage fee outside the storage library. Accordingly, a usage fee calculated outside the storage library may subsequently be received.

This usage fee calculation may be based on a pricing scheme received from an entity that provided the supplemental storage drives 1006 in some approaches. Moreover, the calculated usage fee may be sent to the library and/or drive provider for verification, accounting purposes, acknowledgement, etc. However, in some approaches, data corresponding to the tracked amount that the supplemental storage drives 1006 is used during a period of time may simply be sent to the library and/or drive provider. The provider is thereby able to perform their own usage fee calculations and send a payment request to the customer using the supplemental storage drives in question. It should be noted that as used herein, "provider", "drive provider" and "library provider" are intended to refer to a manufacturer, supplier, service provider, etc., that provides support for the supplemental storage drives 1006 and the terms may be used interchangeably herein.

Figure 11:
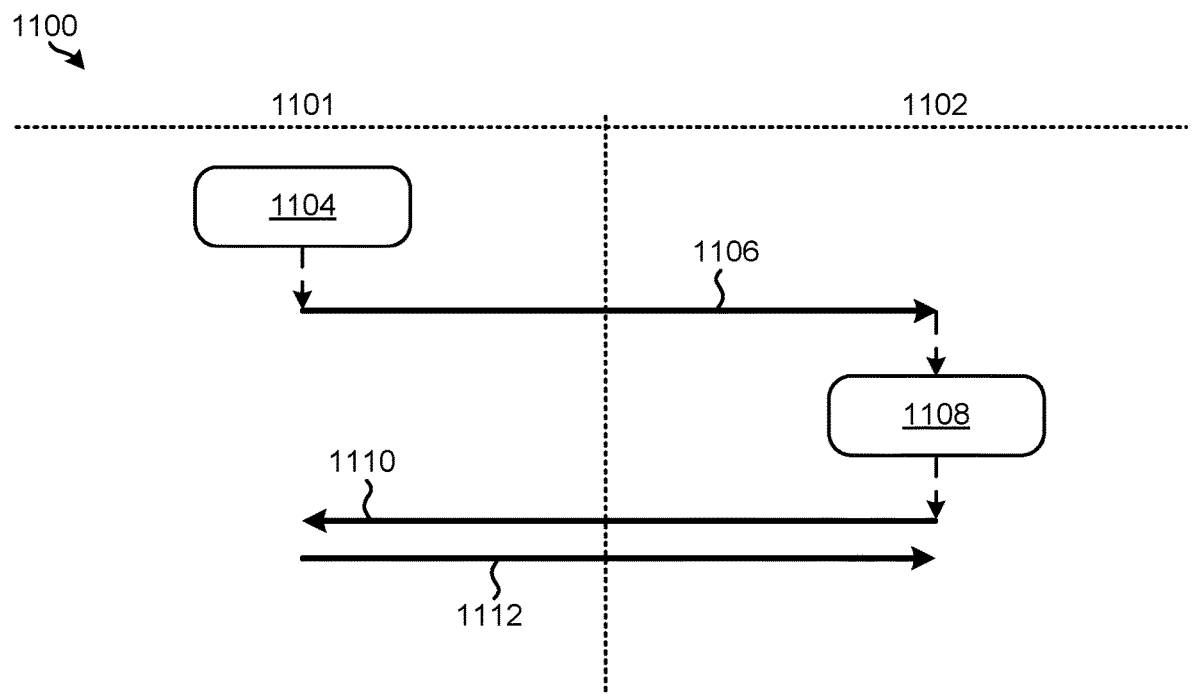
FIG. 11 is a flowchart of a method according to one approach.

Now referring to FIG. 11, a flowchart of a computer-implemented method 1100 is shown according to one implementation. The method 1100 may be performed in accordance with the present invention in any of the environments depicted in FIGS. 1-10, among others, in various approaches. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, each of the nodes 1101, 1102 shown in the flowchart of method 1100 may correspond to one or more processors in a distributed system. Moreover, each of the one or more processors are preferably configured to communicate with each other.

In various approaches, the method 1100 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 11 includes different nodes 1101, 1102, each of which represent one or more processors, controllers, computer, etc., positioned at a different location in a distributed storage system. For instance, node 1101 may include one or more processors which are positioned in a data storage library of a storage system (e.g., see controller 1014 of FIG. 10A above), while node 1102 may include one or more processors which are included at a remote location. According to an example, which is in no way intended to limit the invention, node 1102 may include one or more processors which are included at a provider which supplied the supplemental storage drives. Accordingly, commands, data, requests, etc. may be sent between each of the nodes 1101, 1102 depending on the approach. Moreover, it should be noted that the various processes included in method 1100 are in no way intended to be limiting, e.g., as would be appreciated by one skilled in the art after reading the present description. For instance, data sent from node 1101 to node 1102 may be prefaced by a request sent from node 1102 to node 1101 in some approaches.

As shown, operation 1104 of method 1100 includes tracking (e.g., collecting) information which corresponds to an amount that at least one supplemental data storage drive of an automated data storage library was used during a period of time. Again, the amount that a supplemental data storage drive is actually used to perform data operations is used to determine additional usage fees imposed by the hardware provider.

The information which is tracked in operation 1104 may differ depending on the particular situation. For instance, this tracking information may include one or more types of information. According to various approaches, an illustrative list of the types of information which may be tracked in operation 1104 includes, but is in no way limited to, a first time use of the supplemental data storage drives, a number of hours that the supplemental data storage drives are powered up, a number of mount operations performed by the supplemental data storage drives, a number of bytes read and/or written by the supplemental data storage drives, an actual amount of time the supplemental data storage drives were used (e.g., were activated), a length of recording surface scanned by the supplemental data storage drives, a number of tapes that were processed (e.g., loaded, read and/or written) by the supplemental data storage drives, etc.

The tracking information is sent to node 1102 in operation 1106. As mentioned above, node 1102 may include one or more processors which are included at a remote location relative to node 1101. According to an example, which is in no way intended to limit the invention, node 1102 may include one or more processors which are included at the hardware provider which supplied the supplemental storage drives being tracked in operation 1104. Thus, upon receiving the tracking information from node 1101, operation 1108 includes using the tracking information to calculate a usage fee which corresponds to the amount that the at least one supplemental data storage drive was used during the period of time.

Calculating the usage fee varies depending on the approach. For instance, in some approaches the usage fee actually correlates to the amount that the supplemental storage drives are used. Accordingly, calculating the usage fee may be performed by applying a pricing rate to an amount of usage tracked for a given period. According to an example, which is in no way intended to limit the invention, the usage fee is represented in terms of X dollars for every megabyte (MB) of information read and/or written using the supplemental storage drives. Thus, calculating the usage fee may be performed by simply multiplying the rate of X dollars by the number of MBs the supplemental storage drives were determined as having read and/or written during the period in question. According to other approaches, the usage fee may be represented as a predetermined price per mount operation performed by the supplemental storage drives, unit of time the supplemental data storage drives were used (e.g., activated), unit length of recording surface scanned by the supplemental data storage drives, etc.

However, in other approaches the usage fee may actually be represented as a flat fee for each period of time. Thus, in some approaches the tracking information may simply indicate whether the supplemental storage drives are still included in the automated data storage library. In response to determining that the supplemental storage drives are, a flat fee may be issued to the consumer. Moreover, the flat fee may be predetermined in the terms of an agreement (e.g., service contract) or in any other type of manner, e.g., as would be appreciated by one skilled in the art after reading the present description. In another scenario, the flat fee may include incremental fees in order to recoup original hardware sales. For example, the initial cost of the supplemental data storage drives may be 25% of MSRP but actually utilizing the supplemental data storage drive for the first time may result in a bill for the remaining 75% of MSRP. In other approaches there may be a number of incremental steps that lead to a total charge of 100% of MSRP or more.

Furthermore, operation 1110 includes sending the usage fee to node 1101. It follows that the usage fee is sent to the automated data storage library in which the supplemental drives are implemented. However, in some approaches the usage fee may be sent directly to a user who is associated with (e.g., in charge of managing) the automated data storage library, and able to issue payment of the usage fee. For example, the usage fee may be sent in the form of a bill through a postal service (e.g., through U.S. mail), debited from a banking account, charged to a credit card, posted on an interface of the automated data storage library (e.g., a message, pop-up, text, etc. on a web page or operator panel), etc. Moreover, according to the present description, the act of a processor sending a usage fee to a user may be considered as a trigger event. For example, a processor of node 1102 and/or node 1101 may initiate a billing event with another system (e.g., a financial system, sales system, accounting system, etc.) that causes a bill to be sent to a user through a postal system. It should also be noted that a "user" associated with the automated data storage library may be an entity, a company, an actual individual, etc. depending on the approach.

In response to receiving the usage fee, operation 1112 includes issuing payment of at least a portion of the usage fee. This payment is preferably issued directly to the hardware provider, but may be sent to a prespecified financial account, predetermined address, service provider, business partner, etc. Moreover, payment may be in any form depending on the approach. For instance, payment of the usage fee may be made using legal tender of any currency, cryptocurrency, resources (e.g., as part of a trade), etc.

It follows that various ones of the approaches included herein are able to provide a data storage library which includes reduced cost and/or removable supplemental storage drives. Providing low cost media drives significantly decreases the price associated with achieving a desirable level of performance while also providing the hardware provider the ability to recuperate some of the cost of the hardware by charging a usage fee. The usage fee preferably corresponds to the amount that these supplemental storage drives are actually used in the data storage library, thereby allowing the storage library the ability to meet sudden demand spikes at a reasonable cost. It follows that these supplemental storage drives act as insurance storage drives which are available if needed, thereby achieving a data storage system configuration that is favorable for both the customer and the hardware provider.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as controller 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
performing data operations in an automated data storage library using primary data storage drives of the automated data storage library,
wherein the automated data storage library includes the primary data storage drives and a supplemental data storage drive,
the supplemental data storage drive having a lower level of performance than the primary data storage drives,
wherein the supplemental data storage drive is locked from use outside of situations which meet a predefined circumstance, wherein the predefined circumstance is defined based at least in part on a criterion selected from the group consisting of: a number of data operations waiting in a queue, experienced delay times, whether user permission has been received, and a remaining amount of a budget allocated for supplemental magnetic tape drive usage fees;
unlocking the supplemental data storage drive in response to determining that the predefined circumstance is met;
using the unlocked supplemental data storage drive to perform data operations in parallel with the primary data storage drives for increasing a level of performance of the automated data storage library;
locking the supplemental data storage drive in response to determining that the predefined circumstance is no longer met;
calculating a usage fee which corresponds to use of the supplemental data storage drive while unlocked; and
sending the usage fee to a user associated with the automated data storage library.

2. The computer-implemented method of claim 1, wherein the usage fee is calculated based on tracking information, wherein the tracking information includes a type of information selected from the group consisting of: a first time use of the supplemental data storage drive, a number of hours that the supplemental data storage drive was powered up, a number of mount operations performed by the supplemental data storage drive, a number of bytes read and/or written by the supplemental data storage drive, an amount of time the supplemental data storage drive was used, a number of tapes that were processed by the supplemental data storage drive, and a length of recording surface scanned by the supplemental data storage drive.

3. The computer-implemented method of claim 2, wherein the tracking information includes: a number of mount operations performed by the supplemental data storage drive and a length of recording surface scanned by the supplemental data storage drive.

4. The computer-implemented method of claim 1, wherein the predefined circumstance is defined based on a number of data operations waiting in a queue.

5. The computer-implemented method of claim 1, wherein the predefined circumstance is defined based on experienced delay times.

6. The computer-implemented method of claim 1, wherein the predefined circumstance is defined based on whether user permission has been received.

7. The computer-implemented method of claim 1, wherein the predefined circumstance is defined based on a remaining amount of a budget allocated for supplemental data storage drive usage fees.

8. A storage system, comprising:
a magnetic tape library, having:
one or more primary magnetic tape drives,
a supplemental magnetic tape drive, the supplemental magnetic tape drive having a lower level of performance than the primary magnetic tape drives, and
one or more robotic accessors physically configured to access each of the one or more primary magnetic tape drives and the supplemental magnetic tape drive;
a processor; and
logic integrated with the processor, executable by the processor, or integrated with and executable by the processor, the logic being configured to:
cause, by the processor, performance of data operations using the primary magnetic tape drives,
wherein the supplemental magnetic tape drive is locked from use outside of situations which meet a predefined circumstance, wherein the predefined circumstance is defined based at least in part on a criterion selected from the group consisting of: a number of data operations waiting in a queue, experienced delay times, whether user permission has been received, and a remaining amount of a budget allocated for supplemental magnetic tape drive usage fees;
cause, by the processor, unlocking of the supplemental magnetic tape drive in response to determining that the predefined circumstance is met;
cause, by the processor, the unlocked supplemental magnetic tape drive to perform data operations in parallel with the primary magnetic tape drives for increasing a level of performance of the magnetic tape library;
cause, by the processor, the supplemental magnetic tape drive to become locked in response to determining that the predefined circumstance is no longer met;
track, by the processor, an amount that the supplemental magnetic tape drive is used to perform the data operations during a period of time; and
output, by the processor, usage data which corresponds to the amount that the supplemental magnetic tape drive is used during the period of time for calculation of a usage fee which corresponds to the usage data.

9. The storage system of claim 8, wherein the usage fee is calculated based on tracking information, wherein the tracking information includes a type of information selected from the group consisting of: a first time use of the supplemental magnetic tape drive, a number of hours that the supplemental magnetic tape drive was powered up, a number of mount operations performed by the supplemental magnetic tape drive, a number of bytes read and/or written by the supplemental magnetic tape drive, an amount of time the supplemental magnetic tape drive was used, a number of tapes that were processed by the supplemental magnetic tape drive, and a length of recording surface scanned by the supplemental magnetic tape drive.

10. The storage system of claim 9, wherein the tracking information includes: a number of mount operations performed by the supplemental magnetic tape drive and a length of recording surface scanned by the supplemental magnetic tape drive.

11. The storage system of claim 8, wherein the predefined circumstance is defined based on a number of data operations waiting in a queue.

12. The storage system of claim 8, wherein the predefined circumstance is defined based on experienced delay times.

13. The storage system of claim 8, wherein the predefined circumstance is defined based on whether user permission has been received.

14. The storage system of claim 8, wherein the predefined circumstance is defined based on a remaining amount of a budget allocated for supplemental magnetic tape drive usage fees.

* * * * *